United States Patent [19]

Shim

[11] Patent Number: 4,517,216
[45] Date of Patent: May 14, 1985

[54] GELLAN GUM/GELATIN BLENDS

[75] Inventor: Jaewon L. Shim, San Diego, Calif.

[73] Assignee: Merck & Co., Inc., Rahway, N.J.

[21] Appl. No.: 586,472

[22] Filed: Mar. 5, 1984

[51] Int. Cl.$^3$ .......................... A23L 1/04; A23L 1/06
[52] U.S. Cl. .................................. 426/573; 426/576; 536/1; 536/114; 536/119
[58] Field of Search .................. 426/573, 576; 536/1, 536/114, 119

[56] References Cited

U.S. PATENT DOCUMENTS

| | | | |
|---|---|---|---|
| 4,082,857 | 4/1978 | Croome | 426/576 |
| 4,326,052 | 4/1982 | Kang et al. | 426/573 |
| 4,326,053 | 4/1982 | Kang et al. | 426/573 |

OTHER PUBLICATIONS

Kelco Bulletin CD-31-*Gellan Gum in Microencapsulation*, (2/83).

*Primary Examiner*—Jeanette Hunter
*Attorney, Agent, or Firm*—Gabriel Lopez; Hesna J. Pfeiffer

[57] ABSTRACT

Blends of gellan gum and gelatin are disclosed which exhibit a synergistic increase in gel strength.

10 Claims, No Drawings

GELLAN GUM/GELATIN BLENDS

BACKGROUND OF THE INVENTION

Native S-60 and its deacetylated forms are described in U.S. Pat. Nos. 4,326,052 and 4,326,053. S-60 native, clarified, and non-clarified, form thermoreversible gels upon heating and subsequent cooling.

Gelatin is a mixture of water soluble proteins derived from collagen typically by boiling the skin, tendons, ligaments, and/or bones of animals in water.

SUMMARY OF THE INVENTION

It has now been found that blends of certain forms of S-60 and gelatin in the approximate range of wt:wt ratios of 5:1 to 1:5 exhibit a synergistic increase in gel strength.

DETAILED DESCRIPTION OF THE INVENTION

Heteropolysaccharide S-60 shall be referred to herein as gellan gum; the clarified forms thereof as clarified gellan gum; etc. Thus, the gums will be referred to as native, deacetylated, deacetylated clarified, partially deacetylated, and partially deacetylated clarified gellan gum. Partially deacetylated gallan gum refers to gellan gum having less than 100% but greater than 0% acetyl content compared to native gellan gum.

Partially deacetylated gellan gums are produced under conditions such that the degree of deacetylation ranges from less than 100% to greater than 0%. The degree of deacetylation can be controlled by varying conditions such as temperature (25°–85° C.), the amount of caustic (pH > 7.0), and the reaction time. Deacetylation can be achieved during the fermentation process, i.e., by fermenting under alkaline conditions.

It will be understood by those skilled in the art that reference herein to gum gels shall mean aqueous single phase systems containing an effective amount of the gum and water, optionally with additional materials such as sugars, fats, hydrocolloids, proteins, coloring and flavoring agents, and additional organic or inorganic solvents, including glycols. Thus, "co-acervate gels", which comprise two or more liquid phases, are not included within the scope of this invention.

Blends of gellan gum and gelatin can be prepared as dry mixtures or by combining aqueous solutions or by adding one of the two to an aqueous solution of the other. The gels are then formed by heating to about 80° C. for approximately 10 minutes to dissolve both the gellan gum and the gelatin particles and then allowing the hot aqueous solution to cool to about room temperature.

Although blends of gellan gums and gelatin may be prepared over a broad range of wt:wt ratios, it is preferred that the wt:wt ratio range from about 5:1 to 1:5 gellan gum:gelatin, more preferably about 3:1 to 1:3. One aspect of this invention is blends consisting essentially of gellan gum and gelatin in the wt:wt ratio of 5:1 to 1:5.

Because of the increased gel strengths of the gellan gum/gelatin blends of this invention, the amount of each gum can be significantly reduced for many applications. This is particularly advantageous in systems where it is desired to maintain a low solids level and also for economic reasons. The blends of this invention are used in amounts ranging from 0.05% to 1.0% by weight, preferably 0.2 to 0.4%.

In many applications, gellan gum/gelatin gels require no refrigerantion, a significant advantage over gelatin gels, which do have to be refrigerated.

The synergistic increase in gel strength of gellan gum/gelatin blends is particularly surprising, especially since blends with gelling agents other than gelatin do not exhibit such an increase in gel strength. Of the many gelling agents tested, all but two lowered the gel strength of gellan gum. Only carrageenan was observed to increase the gel strength somewhat but this appears to be due to effects of the calcium and sodium salts in carrageenan rather than from the carrageenan itself.

The synergistic effect is even more surprising since it is not observed with native gellan gum; i.e., only the deacetylated and partially deacetylated forms of gellan gum exhibit a synergistic increase in gel strength when blended with gelatin. Thus, as defined herein "gellan gum" excludes the native form thereof.

Gellan gum/gelatin blends can be used to provide a range of useful gelled industrial (such as deodorant gels) and food products. Typical gelled food products include fabricated vegetables, fruits, meat and fish, aspics, petfoods, water and milk based desserts, syrups and toppings. These gelled products are generally made by preparing an aqueous composition of the food ingredients and dissolved gellan gum/gelatin blend. Gelation is effected by heating to about 80° C. for approximately 10 minutes and then allowing the composition to cool to room temperature.

It will be apparent to those skilled in the art, that variations in, e.g., gel strength, texture, etc., can be expected, depending on the ratio and use levels of specific gellan gum and gelatin used, the type and amount of food ingredients used, etc.

Also, the particular end use will dictate the optimum gel strength or mode of gelation desired. It is considered within the skill of the art for the practitioner to vary the type and amounts of reagents, as taught herein, to overcome particular problems or achieve desired end products.

The invention is further defined by reference to the following examples, which are intended to be illustrative and not limiting.

EXAMPLE 1

Gellan Gum/Other Gelling Agent Blends

In order to identify any synergistic increases in gel strength, deacetylated gellan gum was blended with various gelling agents at a 1:1 wt:wt ratio and changes in gel strength noted.

The results indicate that gelatin and carrageenan are the only gelling agents which may improve the gel strengths of gellan gum.

0.5% solutions of each gelling agent (and 0.25% gellan gum) in synthetic tap water (STW is a solution comprising 1000 ppm NaCl and 143 ppm $CaCl_2.2H_2O$ in deionized water) were stirred 2 hours at room temperature, heated to 80° C. and held 10 minutes. These solutions were stored covered overnight at room temperature. Gel strengths of gelled samples were measured on a Marine Colloids Gel Tester. Samples which did not gel were tested for viscosity. Solutions were then made with dry blends (1:1) of 0.25% of each gelling agent and 0.25% gellan gum and the procedure repeated.

The data of Table 1-1 were obtained.

TABLE 1-1

| | Gellan Gum/Other Gelling Agent | | |
|---|---|---|---|
| | Gel Strength (g/cm$^2$) | | Gel Strength (g/cm$^2$) |
| | Concen. 0.25% | Concen. 0.50% | (0.25% Gellan + 0.25% Gel. Agt.) |
| Deacetylated Gellan Gum | 56 | 116 | — |
| Other Gelling Agent | | | |
| Gelatin 250 (Hormel GP8-OL451-1) | | 0 (20 cp)* | 132 |
| Carrageenan (Seakem KX) | | 0 (15 cp) | 85 |
| LBG-C (locust bean gum - Hathaway) | | 0 (131 cp) | 42 |
| KELTONE$^R$ - food grade sodium alginate | | 0 (34 cp) | 0 |
| Corn Starch (Kingsford) | | 0 (6 cp) | 42 |
| Pectin (PFW, type AA, medium rapid set) | | 0 (8 cp) | 37 |

*Viscosities for solutions which did not gel: Brookfield LVT, 60 rpm, appropriate spindle.

EXAMPLE 2

Effect of Gum Ratios on Gel Strength

Gum blends of gellan gum and gelatin (total gum level of 0.5%) at various blend ratios were continuously stirred in STW at approximate 800±50 rpm by Lightnin mixers for two hours at room temperature. The solutions were then heated to 80° C. and held for ten minutes with continuous stirring. The solutions were poured into 50 ml beakers and stored with cover overnight at room temperature. The gel strengths (g/cm$^2$) of the samples were measured using a Marine Colloids Gel Tester. Each gum blend ratio was run in duplicate. Gellan gum was blended with gelatin at the ratios of 0/100, 25/75, 50/50, 75/25 and 0/100 wt:wt. Solutions of gellan gum at 0.25%, 0.375% and 0.5% were prepared as controls.

Based on gel strength, the optimal gum blend ratios (total gum concentration of 0.5%) were 1:1 gellan gum/gelatin. The 1:1 gallan gum/gelatin blend showed 277% and 60% increases in gel strength as compared to 0.25% and 0.5% gellan gum, respectively. The data are shown in Table 2-1.

The inherent ion content for each component was measured. From the measured ion level by atomic absorption analysis, it was apparent that the ion contribution from the inherent ion levels (Ca$^{++}$ and Na$^+$) of gellan gum and gelatin were negligible as compared to the overall salt concentration in the STW. Thus, the gel strength increase observed with gellan gum and gelatin is not the result of a salt effect.

TABLE 2-1

| Gel Strength of Gellan Gum/Gelatin Blends | | |
|---|---|---|
| % Gellan | % Gelatin | Average (n = 4) Gel Strength (g/cm$^2$) |
| — | 0.5 | (4 cP*) |
| 0.125 | 0.375 | 79 |
| 0.25 | 0.25 | 147 |
| 0.375 | 0.125 | 123 |

TABLE 2-1-continued

| Gel Strength of Gellan Gum/Gelatin Blends | | |
|---|---|---|
| % Gellan | % Gelatin | Average (n = 4) Gel Strength (g/cm$^2$) |
| Controls | | |
| 0.125 | — | 21 |
| 0.250 | — | 39 |
| 0.375 | — | 53 |
| 0.500 | — | 92 |

*Viscosities for solutions which did not gel; Brookfield LVT, 60 rpm, appropriate spindles.

EXAMPLE 3

Partially Deacetylated Gellan Gum Gels

Native gellan gum fermentation liquor was reacted for 3 hours at 40° C. with 1M NH$_4$OH to achieve 50% deacetylation of the gellan gum (method of Hestrin, *J. Biochem.* 180, 249–261 (1949), using acetylcholine chloride as the standard).

50% deacetylated gellan gum (1.5% wt./vol.) was hydrated in DI water and then 1% NaCl was added. This produced a gel with a gel strength of 15 g/cm$^2$ (Marine Colloids GT-3, small head plunger).

50% deacetylated gellan gum (1.5% wt./vol.), Calgon (0.08%) and CaSO$_4$ (0.31% wt./wt.) were stirred in STW for 20 minutes. A gel was formed having a gel strength of 42 g/cm$^2$.

50% deacetylated gellan gum (0.5% wt./vol.) was added with mixing to milk containing 0.5% TSPP and the viscosity compared to a control containing no gellan gum. To these compositions was added 0.54% CaSO$_4$, and the compositions were allowed to set for 24 hours. The data of Table 3-1 were obtained.

TABLE 3-1

| Partially Deacetylated Gellan Gum Gels | | |
|---|---|---|
| Sample | Viscosity (cP) | Gel Strength (gm/cm$^2$)* |
| 50% Deacetylated | 325 | 178 |
| Control | 120 | 17 |

*Marine Colloids GT-3 (small head plunger)

EXAMPLE 4

Mild pH Partial Deacetylation

Gellan gum fermentation liquor was reacted with 0.25×KOH and 0.5×KOH* at 85° C. Samples were taken at 2–3 minute intervals and the degree of deacetylation and gel strengths were determined. The data of Table 4-1 were obtained.

*1.0×KOH represents the amount of KOH calculated to fully deacetylate all the native gum, as determined by IPA precipitation, in a batch of fermentation liquor, assuming the gum to have a 4% acetyl content.

Gels were prepared by addition of 0.55 g of gellan gums to 100 g of deionized water containing 750 ppm of MgCl$_2$.6H$_2$O, autoclaving 15 minutes at 250° F., cooling the mixture and standing 4 hours at room temperature.

TABLE 4-1

| Mild pH Partial Deacetylation | | | |
|---|---|---|---|
| Time (min.) | Acetyl (%) | Deacetyl. (%) | Gel Strength[1] (gm/cm$^2$) |
| 0 | 3.67 | 0 | 0 |
| 0.25 × KOH | | | |
| 5 | 1.94 | 47 | 190 |
| 8 | 1.54 | 58 | 148 |
| 10 | 1.43 | 61 | 230 |

TABLE 4-1-continued

| | Mild pH Partial Deacetylation | | |
|---|---|---|---|
| Time (min.) | Acetyl (%) | Deacetyl. (%) | Gel Strength[1] (gm/cm$^2$) |
| 12 | 1.88 | 49 | 243 |
| 15 | 1.71 | 53 | 243 |
| 0.5 × KOH | | | |
| 2 | 0.45 | 88 | 328 |
| 5 | 0.23 | 94 | — |
| 8 | 0.21 | 94 | 412 |
| 10 | 0.14 | 96 | — |
| 12 | 0.13 | 97 | — |
| 15 | 0.16 | 96 | 391 |

[1]Marine Colloids Gel Tester (GT-3) using small head plunger. This equipment was also used in Example 5.

EXAMPLE 5

Variable pH Partial Deacetylation

Gellan gum fermentation liquors were reacted at 85° C. for 5 minutes with various amounts of KOH. The data of Table 5-1 were obtained.

TABLE 5-1

| | Variable pH Partial Deacetylation | | | |
|---|---|---|---|---|
| × KOH | Initial pH | Acetyl (%) | Deacetyl. (%) | Gel Strength[1] (gm/cm$^2$) |
| 0 | — | 5.1 | 0 | — |
| 0.075 | 8.4 | 4.3 | 16 | — |
| 0.10 | 8.5 | 3.2 | 37 | 15 |
| 0.15 | 8.2 | 3.3 | 35 | 17 |
| 0.20 | 8.8 | 2.8 | 45 | 57 |
| 0.25 | 9.2 | 2.9 | 43 | 42 |
| 0.30 | 9.4 | 2.5 | 51 | 66 |
| 0.35 | 9.5 | 2.2 | 57 | 89 |
| 0.40 | 10.0 | 2.2 | 57 | 114 |
| 0.45 | 10.4 | 1.5 | 71 | 159 |

[1]Gels were prepared and gel strengths determined as in Example 4.

EXAMPLE 6

Native Gellan Gum/Gelatin Blend

Following substantially the procedure of Example 1 but using 1% gum, and 2% blend solutions, native gellan gum was compared to 50% deacetylated gellan gum. Although a significant increase in gel strength was exhibited by the 50% deacetylated gellan gum/gelatin blend, no increase was exhibited by the native gum. The data are shown in Table 6-1

TABLE 6-1

| | Native Gellan Gum/Gelatin Blend | |
|---|---|---|
| | Gel Strength (g/cm$^2$) 1% (wt) | Gel Strength (g/cm$^2$) 1% Gellan + 1% Gelatin |
| Gelatin (Atlantic Gelatin, Gen'l Foods) | 0 | — |
| Native Gellan Gum | 131 | 121 |
| 50% Deacetyl. Gellan Gum | 81 | 617 |

What is claimed is:

1. A blend consisting essentially of gellan gum and gelatin wherein the wt:wt ratio ranges from 5:1 to 1:5.
2. A blend of claim 1 wherein the gellan gum is deacetylated, deacetylated clarified, partially deacetylated, or partially deacetylated clarified.
3. An aqueous composition comprising water and a blend of claim 2.
4. A composition of claim 3 further comprising one or more of sugar, fat, hydrocolloid, protein, color agent, flavoring agent, organic solvent, or inorganic solvent.
5. A composition of claim 4 wherein the organic solvent is a glycol.
6. A blend of claim 2 wherein the wt:wt ratio is about 3:1 to 1:3.
7. A gel which comprises a total of 0.05 to 1% (wt) of gellan gum and gelatin wherein the wt:wt ratio of gellan gum to gelatin ranges from 5:1 to 1:5.
8. A gel of claim 7 wherein the total of gellan gum and gelatin is 0.2 to 0.4% (wt).
9. A gel of claim 7 further comprising one or more of sugar, fat, hydrocolloid, protein, color agent, flavoring agent, organic solvent, or inorganic solvent.
10. A gel of claim 8 wherein the wt:wt ratio is about 3:1 to 1:3.

* * * * *